United States Patent [19]

Wöhrl et al.

[11] Patent Number: 4,781,388
[45] Date of Patent: * Nov. 1, 1988

[54] BRUSH SEAL

[75] Inventors: Bernhard Wöhrl, Gauting; Klaus Hagemeister, Munich, both of Fed. Rep. of Germany

[73] Assignee: MTU -Motoren-und Turbinen Union München GmbH, Munich, Fed. Rep. of Germany

[*] Notice: The portion of the term of this patent subsequent to Jul. 14, 2004 has been disclaimed.

[21] Appl. No.: 853,679

[22] Filed: Apr. 18, 1986

[30] Foreign Application Priority Data

Apr. 20, 1985 [DE] Fed. Rep. of Germany ....... 3514382

[51] Int. Cl.[4] ............................................. F16J 15/447
[52] U.S. Cl. ........................................ 277/53; 165/81; 165/159; 277/94; 277/184; 277/189
[58] Field of Search ................... 277/53, 57, 94, 181, 277/184, 185, 189; 415/172 R, 174, 173 R, 173 A, 111, 113; 165/9, 159, 160, 78, 81, 82, 83

[56] References Cited

U.S. PATENT DOCUMENTS

| | | | |
|---|---|---|---|
| 885,032 | 4/1908 | DeFerranti | 277/53 X |
| 2,363,526 | 11/1944 | Hobbs | 165/160 |
| 2,517,512 | 8/1950 | Tigges et al. | 165/9 |
| 2,666,624 | 1/1954 | Flurschutz | 165/9 |
| 2,878,048 | 3/1959 | Peterson | 277/53 X |
| 3,020,185 | 2/1962 | Moffitt, Jr. et al. | 277/181 X |
| 3,181,602 | 5/1965 | Johnstone | 165/78 X |
| 3,183,967 | 5/1965 | Mettenleiter et al. | 165/83 |
| 4,036,293 | 7/1977 | Tank et al. | 165/81 X |
| 4,159,828 | 7/1979 | Ostling et al. | 277/53 X |
| 4,335,784 | 6/1982 | Arvidsson | 165/9 |
| 4,548,260 | 10/1985 | Stachura | 165/160 X |
| 4,586,564 | 5/1986 | Hagfmeister | 165/81 X |
| 4,679,619 | 7/1987 | Wohrl et al. | 165/159 X |

FOREIGN PATENT DOCUMENTS 2938484 3/1981 Fed. Rep. of Germany .......... 277/3

Primary Examiner—Allan N. Shoap
Attorney, Agent, or Firm—Roberts, Spiecens & Cohen

[57] ABSTRACT

A brush seal for first and second spaced, adjoining members which are capable of undergoing universal relative displacement, the seal comprising a plurality of flexible bristles having opposite ends, one of which is secured in a clamp causing the bristles to fan outwardly towards the other end. The second member supports a joint defining a space with a throat into which the fan of bristles enter and are resiliently squeezed at the throat. The free ends of the bristles are spaced for free movement in the joint lengthwise of the bristles to accommodate relative movement of the members towards and away from one another. Relative movement of the members longitudinally in their respective planes in taken up by sliding of the bristles within the joint while relative movement of the members transversely in their respective planes is taken up by bending of the bristles at the throat. In the case of all relative movement of the members, the bristles maintain sealing contact with the joint at the throat.

19 Claims, 3 Drawing Sheets

BRUSH SEAL

FIELD OF THE INVENTION

The invention relates to a brush seal for sealing the space between first and second adjoining members which are capable of undergoing universal relative movement. The invention is particularly applicable to components of turbo machines especially gas turbine engines, and specifically to heat exchangers for sealing the space between casing or housing elements which can undergo relative movement due to differential thermal effects.

PRIOR ART

In internal combustion engines, gas turbine engines, jet engines or heat exchangers there often is a requirement to seal ducts carrying highly heated fluids such as hot gases at a certain point, for example, to change the direction of flow of the hot gases. In view of the often extremely differing thermal loads and expansions of adjacent walls or components of the duct, it is substantially impossible to provide a rigid sealing connection between the components.

Apart from the thermal problems noted above, a duct seal of this type must also accommodate vibrations and vibration-induced deflections of at least one of the two wall components relative to the other caused by vehicle shock loads. Such vibrations also prevent the use of a rigid connection for the seal between adjacent wall sections.

Mechanical seals are known which operate by frictional engagement of corresponding seal liners to seal ducts while compensating for relative movement, such seals are comparatively complex in design and are subject to relatively rapid and high wear.

SUMMARY OF THE INVENTION

An object of the present invention is to provide a seal which is low in wear and maintenance, which compensates for relative movement, and which is especially suitable for obturating the flow of hot gases.

In accordance with the above and further objects of the invention, there is provided a brush seal for sealing first and second spaced adjoining members which are capable of undergoing universal relative movement, such as due to differential thermal effects and vibration, said brush seal comprising a plurality of bristles having opposite ends with means secured to the first member for securing one of the ends of the bristles to the first member and means secured to the second member for supporting the other of the ends of the bristles for relative movement to permit the relative universal movement of the members while providing sealing between said members.

In a particular embodiment of the invention, the means which is secured to the second member comprises a fork, including opposite spaced legs, defining a space into which the bristles are received.

Due to the flexibility of the bristles, the spaced adjoining members can undergo relative movement in their respective planes and this will be accommodated by the flexibility of the bristles. When the members move towards and away from one another, the bristles move within the space between the legs of the fork to accommodate this movement.

The bristles are resiliently clamped by the free ends of the legs of the fork at the throat at which the bristles enter the fork whereby to establish the seal.

In another embodiment, the free ends of the bristles are clamped within the space in the fork so that the bristles are flexed outwardly and provide a widened section at which the bristles movably and resiliently abut against the legs of the fork.

German Patent DE-PS No. 30 23 609 discloses a turbine for a gas turbine engine having a shroud which surrounds the tips of the rotor blades, which shroud is carried by the turbine casing and is supported with respect to the casing for thermal expansion radially. The shroud forms a section of the radially outer wall of the annular gas duct. In this arrangement, the shroud consists of a ceramic material and is radially carried by the turbine casing at a distance therefrom by an annular array of projecting bristles, which are arranged on the turbine casing such that they form an annular brush seal. The brush-shaped carrier arrangement ensures that while fully maintaining the concentric arrangement, the resilience of the individual bristles will compensate for certain differences in distance between the shroud and the casing ring without inducing substantial forces between these two parts.

This construction is based on the combination of the brush seal with the ceramic shroud, which is subjected only to moderate thermal expansion in service, to provide a minimum blade tip clearance. The present invention has no bearing whatever on this arrangement.

Unlike the construction mentioned above, the present invention provides an obturating seal, which may be directly exposed to the hot gas stream and which enables extremely different relative movements between adjacent components to be accommodated without being subject to special limitations in movement especially in the longitudinal direction of the seal as in the case just described, which over the entire service range relies on a supporting or carrying function.

The seal of the present invention provides a brush-type sealing enclosure which is free for universal movement in all directions and provides continuous sealing. The fork also guides the bristles such that in the case of relatively high gas temperatures, when the bristles might at least partially lose some of its elastic properties, a sealing contact will invariably remain between the inner joint walls extending in the longitudinal direction of the component and the bristles or filaments of the brush seal.

DETAILED DESCRIPTION OF PREFERRED EMBODIMENTS OF THE INVENTION

Figure 1:
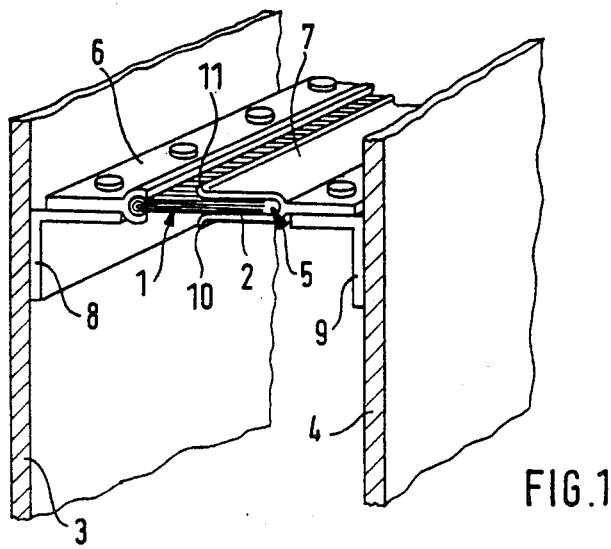
FIG. 1 is a perspective view of a portion of two adjacent casing components incorporating a brush seal according to a first embodiment of the invention.

FIG. 1 illustrates a brush seal having flexible bristles or filaments 2 for bridging the spacing between two relatively displaceable adjacent casing components 3, 4, which may be the wall members of an exhaust gas duct.

In accordance with the basic concept of the invention, one end of the bristles 2 is fixedly connected to casing component 3 and the free ends of the bristles 2 are supported in a joint 5 of the casing component 4 for universal movement in the directions of axes x, y, z.

According to one advantageous aspect of the present invention the joint 5 comprises a fork 7 having spaced, opposed legs 7A, 7B defining a space 7C having a depth T dimensioned to accommodate the maximum anticipated relative displacement between casing components 3 and 4 towards and away from one another. Hence, thermal expansions or movements caused by vibrations can be compensated. More particularly, relative movement of the components 3,4 in their planes i.e. in the y and z directions are accommodated respectively by flexible deformation of the bristles 2 and travel of the bristles lengthwise of the fork. For relative movement of the components towards and away from one another i.e. in the x direction, the bristles travel in and out in the fork.

For proper sealing of hot gas flow under all operating condtions, the legs 7A, 7B of the fork are spaced apart by a distance $B_1$ at their free ends to form a throat where the bristles enter the fork, said distance $B_1$ being less than the width $B_2$ of the spread unmounted ends of the bristles so as to apply a resilient clamping force on the bristles at the free ends of the legs of the fork.

In a mechanically extremely simple construction, the bristles or filaments 2 of the brush seal 1 can be mounted and held on a support element 6 extending lengthwise of the casing component 3, while the fork 7 extends along casing component 4 parallel thereto.

The support element 6 and the fork 7 are connected to the associated casing component 3, 4 by respective angle plates 8 and 9.

Figure 3:
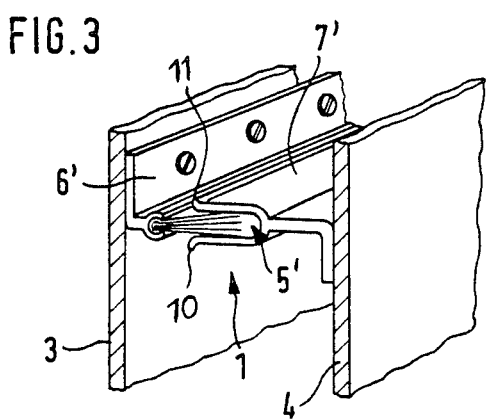
FIG. 3 is similar to FIG. 1, but with the casing components closer together and with a different seal support and mounting means.

In the embodiment of FIG. 3 where similar elements are designated by the same reference characters with primes, the element 6' has a bend therein and is directly connected to casing component 3 while the stem of fork 7' has a bend therein and is directly connected to casing component 4. In this way, the support element 6' and the fork 7' can be directly connected to the casing components and eliminate the need for the angle plates 8 and 9 of FIG. 1.

Figure 2:
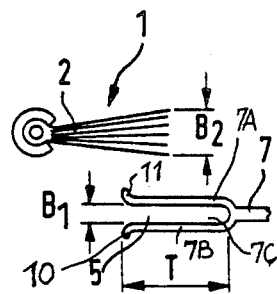
FIG. 2 is an exploded end view of a part of the brush seal in FIG. 1.

As apparent in FIGS. 1 to 3, the fork 7 has outwardly curled front edges 10, 11 which facilitate assembly of the seal i.e. entry of the free ends of the bristles into the throat of the fork.

In FIGS. 1 and 3 the plates 3, 4 are shown to be flat, however, these could also be curved.

With a view to the respective prevailing temperature criteria suitable materials are used for the brush seal. For example, the bristles or filaments 2 can be made of a highly heat resistant metallic material or of glass filaments.

In FIGS. 1 to 3, the ends of bristles 2 are tightly clamped in support element 6 to cause the bristles 2 to fan outwardly so that where the bristles enter space 7C at the throat of fork 7, the bristles are resiliently squeezed at the throat to provide sealing thereat.

The brush seal of the present invention can be used especially as a seal for hot gases between the casing components of turbomachines, especially gas turbine engines.

An advantageous application of the seal of the invention as a seal for hot gases will be described hereafter in relation to FIG. 4.

Figure 4:
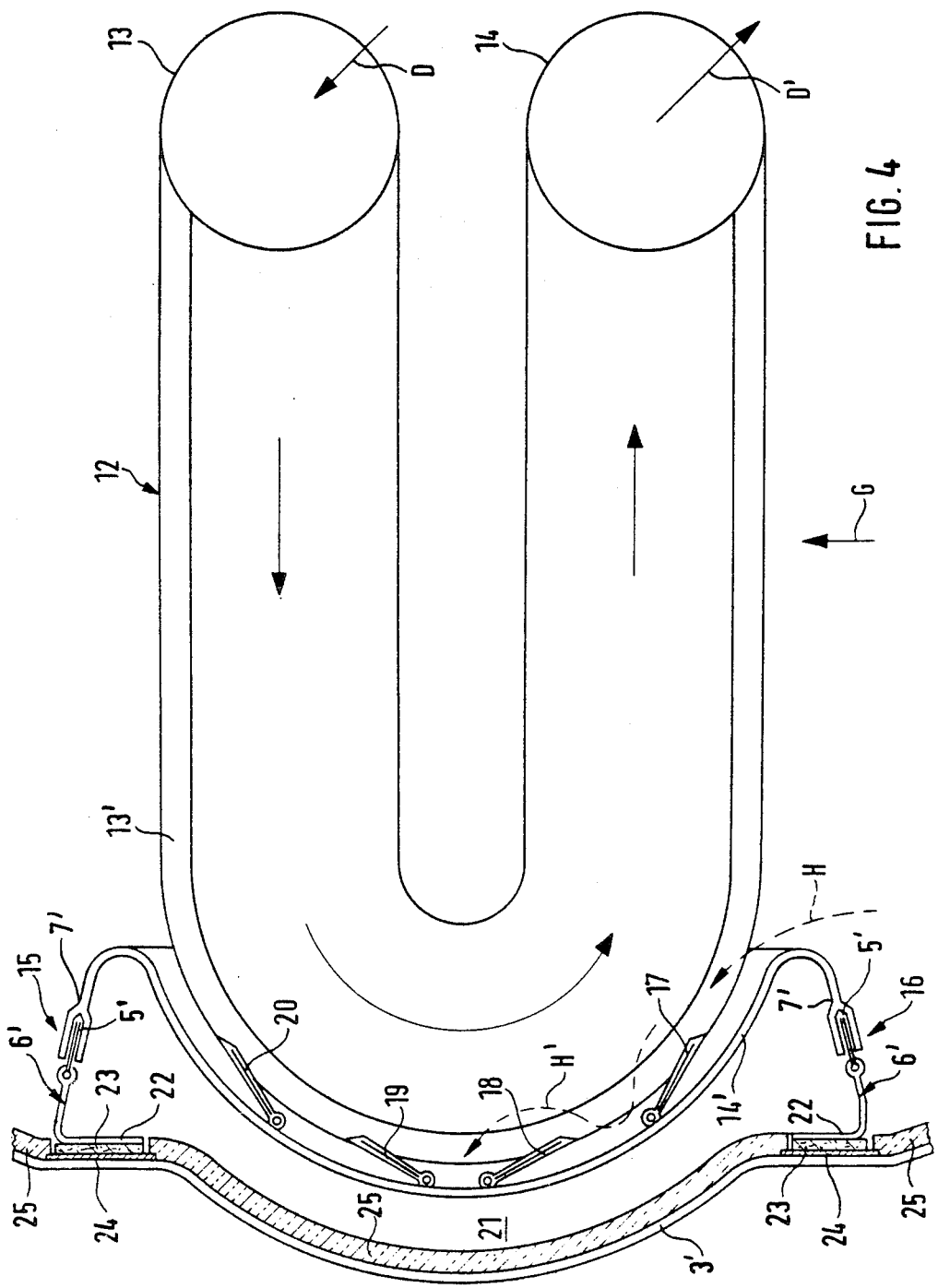
FIG. 4 is a front view of a heat exchanger in which the brush seal of the invention is utilized.

In FIG. 4, there is seen a heat exchanger which comprises an assembly or matrix 12 of spaced heat exchanger tubes 13' of U-shape which are positioned within a housing such that heated gases G can flow across the tube matrix 12 in the direction of the arrow from an inlet region in the housing below the matrix in FIG. 4 to an outlet region in the housing above the matrix in FIG. 4. The tubes 13' of the matrix are arranged in staggered relation in rows and columns as well known in the art, as exemplified in Ser. No. 677,190, filed Dec. 3, 1984, now U.S. Pat. No. 4,586,564, issued May 6, 1986.

The U-shaped tubes 13' of the matrix 12 have straight legs respectively connected to inlet and outlet ducts 13, 14. The ducts 13 and 14 extend substantially parallel to one another in a direction perpendicular to the flow of gases G. The matrix 12 projects transversely from the ducts and extends along the length of the ducts. An operating fluid, such as compressed air, is supplied to the tubes 13' of the matrix at D at duct 13 and the operating fluid flows through the interior of the tubes and is discharged at D' from duct 14 for supply to a utilization means, such as the combustion chamber of a gas turbine engine. In the course of travel of the compressed air through the tubes, the compressed air is heated by the gases G flowing around the exterior of the tubes so that the compressed air supplied to duct 14 from the tubes 2 is heated.

The U-shaped tubes 13' have curved U-portions connected to the straight legs and the compressed air flowing in the tubes undergoes reversal of direction in the curved U-portions. The curved U-portions of the tubes are surrounded by a limiting wall 3' of the housing which is thermally insulated.

Between the wall 3' and the curved U-portions of the tubes of the matrix is a wall element 14' in the form of a cover shell which is subjected to operational movements, particularly thermally induced movements.

In FIG. 4 are also seen seals 15, 16 for blocking flow of hot gases between wall element 14' and wall 3'. The seals 15, 16 are constructed in accordance with the invention to compensate for any relative movement between the wall element 14', as one casing component and the thermally insulated wall 3' as the other casing component. FIG. 4 thus embodies the application of the brush seals of FIG. 3 at the upstream and downstream locations of the outer wall 3'. The wall element 14' itself is sealed at a number of locations, while being capable of relative movement with respect to the U-shaped bend portions of the matrix 12, by further brush seals 17, 18, 19, 20. The brush seals 17, 18, 19, 20 are attached to wall element 14' and seal the bend portion of the tubes 13'. The brush-type seals 16 and 15, respectively, prevent a flow of hot gases into and through the intermediate space 21 between wall element 14' and casing 3' whereat the hot gases do not effectively take part in the heat exchange. At the hot gas inlet at the bottom of the matrix 12, the inlet gases proximate the free end of the matrix are diverted in the direction of the arrow H around the periphery of the U-shaped curved portion of the matrix. The combination of the shell-shape of wall element 14' and the brush seals 17, 18, 19, 20 produces a meandering forced flow H' of the hot gases at the periphery of the matrix whereby a desirable combination of crossflow and counterflow heat-exchange takes place in the U-shaped curved portion of the matrix.

The brush seals 15, 16 are attached by the support elements 6' and the bristles engage at the other end for sealing action in the joints 5' of the wall element 14'.

The support elements 6' are brazed at their integral bend portions 22 to a metal felt insulator 23 which carries on the side opposite the element 6' a plate 24 also brazed thereto, which in turn is attached to wall 3'. This attachment inclusive of insulator 23 constitutes an insulator attachment unit separate from the thermal insulation 25 on the interior of wall 3'.

In FIG. 4 the bend portions 22 of respective support elements 6' of the brush seals 15 and 16 are formed as flat plate components connected to straight sections of wall 3'. The respective forks 7' are secured to the ends of shell-shaped wall element 14' such that the bristles of seals 15 and 16 respectively extend in common inclined planes between wall 3' and wall element 14'.

In a departure from the embodiment in FIG. 4, the brush seal can also advantageously be arranged between one or more walls 3' around the heat exchanger matrix 12 and a corresponding lateral section of the casing carrying the hot gases, so that relative differential movements caused by temperature or vehicle shock loads between the wall 3' and the casing can be bridged for sealing action. The lateral brush seal would then serve the function of deflecting to the matrix 12 the hot gas which entered into the respective intermediate space between the walls 3' and the casing from the main hot gas flow G.

Figure 5:
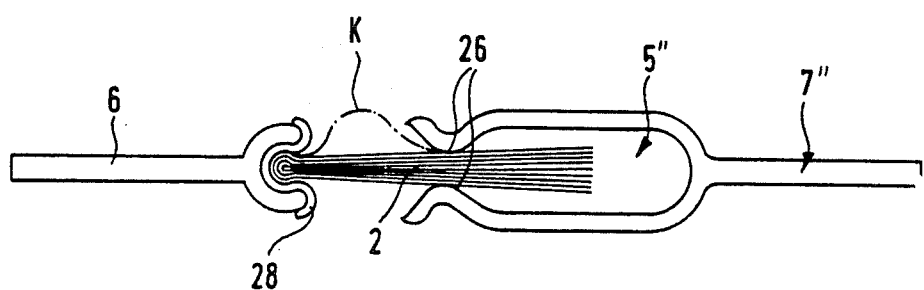
FIG. 5 is an end view of a brush seal with a support element and mating part according to a second embodiment of the invention.

In FIG. 5 there is seen a brush seal in which the joint 5" accommodating the ends of the bristles 2 has a tongue-shaped bristle throat 26, behind which the joint 5" widens beyond the spreading ends of the bristles.

Figure 6:
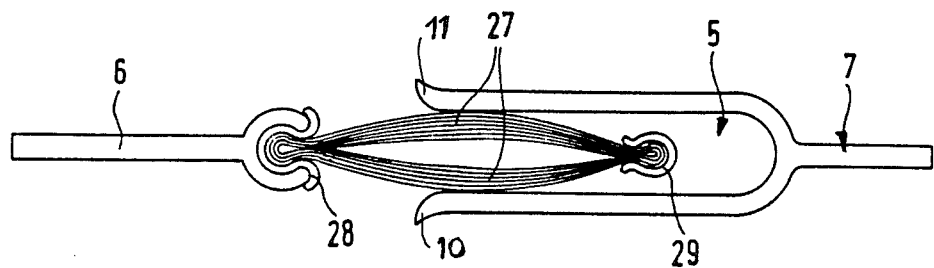
FIG. 6 is an end view of a brush seal with a support element and mating part according to a third embodiment of the invention.

In the brush seal of FIG. 6, the bristles or filaments 27 are secured at both ends by clamp members 28, 29 such that the bristles are flexed outwardly to movably abut against the inner wall sections of the fork-shaped joint 5" to effect sealing thereat by means of uniformly, radially widening flexed sections.

The brush seals of FIGS. 5 and 6 provide the essential advantage that in the presence of comparatively large differential movements between the components (for example, components 3 and 4 in FIG. 1) especially in the x and y directions the respective bristles 2 and 27 are prevented from being bent as shown at K in FIG. 5 by the joint 5. Rather, the free ends 10, 11 of the fork can smoothly travel on the flexed portions of the bristles to take up differential movement of components 3, 4 in directs x, y and z.

Although the invention has been described in relation to specific embodiments thereof, it will become apparent to those skilled in the art that numerous modifications and variations can be made within the scope and spirit of the invention as defined in the attached claims.

What is claimed is:

1. A brush seal for first and second spaced, adjoining members which are capable of undergoing universal relative displacement, said seal comprising a plurality of flexible bristles having opposite ends, means secured to the first member for securing one of the ends of the bristles to the first member in a state in which the bristles fan outwardly from said one end towards the other end and the thickness of the seal increases in a direction away from said one end, and fork means secured to the second member for embracing the other of the ends of the bristles to permit the relative universal displacement of the members while providing sealing between said members, said fork means comprising opposed spaced legs defining a space into which said other end of the bristles extends for relative free movement to accomodate said universal relative displacement of said members, said legs having free ends defining a throat at which the bristles enter said space, said legs being spaced apart by a distance less than the thickness of the fan of said plurality of bristles to apply resilient squeezing force to the bristles and provide sealing between said first and second members in their original positions and when displaced.

2. A seal as claimed in claim 1 wherein said other end of the bristles extends into said space for free displacement lengthwise of said bristles.

3. A seal as claimed in claim 2, wherein said other end of the bristles forms a clearance in said space which represents the maximum relative movement of said members towards one another.

4. A seal as claimed in claim 1 wherein said means which secures one of the ends of the bristles comprises a clamp engaging said one end of the bristles, said bristles having free ends which are spaced for free movement in said joint lengthwise of the bristles.

5. A seal as claimed in claim 1 wherein said means secured to said first member comprises a support element secured to said first member along the length thereof.

6. A seal as claimed in claim 5 wherein said support element extends parallel to said first member.

7. A seal as claimed in claim 5 wherein said support element comprises an angle plate.

8. A seal as claimed in claim 1 wherein said fork is secured to said second member and extends along the length thereof.

9. A seal as claimed in claim 8 wherein said fork extends parallel to said second member.

10. A seal as claimed in claim 1 wherein said means secured to said second member further comprises an angle plate fixed to said fork.

11. A seal as claimed in claim 10 wherein said angle plate is intergral with said fork.

12. A seal as claimed in claim 1 wherein said legs include outwardly curved portions at said free ends.

13. A seal as claimed in claim 1 wherein the spacing of the legs increases from the throat into the fork.

14. A seal as claimed in claim 1 comprising means within said space of said fork for clamping said other end of the bristles to cause said bristles to flex outwardly between said ends and provide a widened section at which the bristles movably and resiliently abut against said legs of the fork.

15. A seal as claimed in claim 1 wherein said first and second members are flat plates.

16. A seal as claimed in claim 1 wherein said first and second members are curved plates.

17. A seal as claimed in claim 1 said means secured to the first member includes a support element for said one end of the bristles, said support element including a flat plate section attached to said first member, said second member being curved, said fork being secured to said second member.

18. A seal as claimed in claim 1 wherein said fork and said bristles are disposed substantially in a common plane.

19. A seal as claimed in claim 18 wherein said plane is inclined with respect to at least one of said members.

* * * * *